Nov. 18, 1952
T. H. WIANCKO
2,618,776
ACCELEROMETER
Filed June 25, 1951
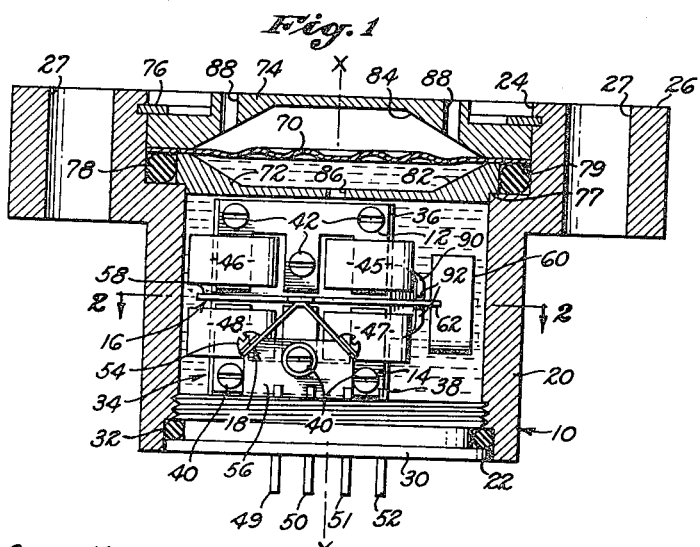
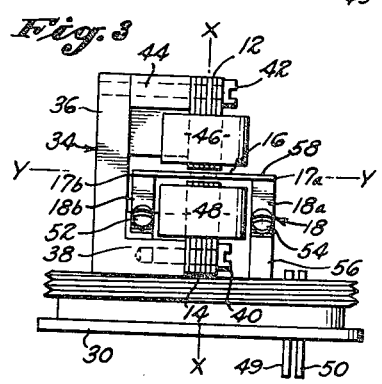
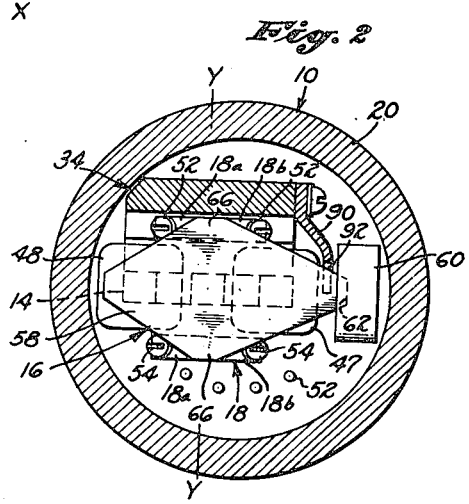
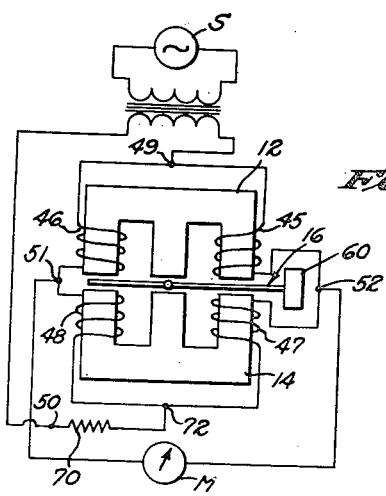
INVENTOR.
THOMAS H. WIANCKO
BY
ATTORNEY.

Patented Nov. 18, 1952

2,618,776

UNITED STATES PATENT OFFICE 2,618,776

ACCELEROMETER

Thomas H. Wiancko, Altadena, Calif.

Application June 25, 1951, Serial No. 233,269

9 Claims. (Cl. 336—30)

My invention relates to improvements in vibration measuring devices and more particularly to an improved accelerometer of the variable reluctance type.

In my copending patent application Serial No. 233,268, filed June 23, 1951, there is described and claimed a variable reluctance accelerometer employing two magnetic circuits the reluctances of which are varied in opposite directions by the action of a dynamically unbalanced armature arranged to rotate about a pivot or rotational axis. In that copending application there is also described and claimed a device employing a dihedral spring structure upon which is mounted a rotating member as such an armature.

One of the objects of my invention is to provide an improved accelerometer that employs a dynamically unbalanced armature that is more sensitive, simpler in construction, more easily balanced to be insensitive to vibrations transverse to the vibration axis, and of lower manufacturing cost.

Another object of my invention is to provide an oil-damped accelerometer with an improved means for compensating for the expansion and contraction of the oil caused by changes in temperature.

An important feature of my present invention is a symmetrical dynamically unbalanced armature mounted in such a relationship to two pairs of pole tips that four gaps are formed in four corresponding magnetic circuits. The dimensions of these gaps vary when the device is subjected to an external accelerating force in such a way that the relative magnitudes of the reluctances of the magnetic circuits change, and the variations of the relative magnitudes of the reluctances are measured by means of coils linked with those circuits to detect the vibrations of the accelerometer. Other important novel features of my invention reside in the construction of the dynamically unbalanced inertia member that includes the armature, the nature of the spring suspension, the system for compensating for temperature variations of the accelerometer, and the general arrangement of the parts.

The foregoing and other objects and features of my invention will become apparent from the following detailed description when considered in connection with the accompanying drawing illustrating a single embodiment thereof. In the drawing wherein like reference characters indicate like elements throughout the several views:

Figure 1 is a cross-sectional view of an accelerometer according to the present invention;

Fig. 2 is a sectional view of the accelerometer as viewed on the plane 2—2 of Fig. 1;

Fig. 3 is an elevational view of the accelerometer with the face or housing removed; and Fig. 4 is a schematic wiring diagram of a bridged circuit utilizing the accelerometer.

Referring to the drawings and more particularly to Figs. 1-3 inclusive there is illustrated an accelerometer comprising a housing 10 within which is mounted a pair of laminated E-shaped magnetic structures 12 and 14 and a symmetrical dynamically unbalanced inertia member 16 resiliently supported by a dihedral spring structure 18. The accelerometer is designed to measure components of acceleration along a selected vibration axis X—X which for convenience in description herein is assumed to be vertical, unless otherwise specified.

The housing 10 comprises a hollow cylindrical body 20 having a first mouth 22 at the lower end and a second mouth 24 at the upper end all arranged concentric with the vibration axis X—X. A base 26 is provided at the upper end in the form of an outwardly projecting flange having holes 27 to facilitate mounting the base in direct contact with the object whose vibration is to be measured. The outer surface 28 at the base is flat or otherwise shaped to define the vibration axis X—X in a selected direction along which acceleration is to be detected and measured.

A plug 30 threadably engages the lower mouth 22 and is sealed therein by means of an O-ring 32. A non-magnetic support element 34 formed unitary with the plug 30 extends inwardly thereof, the support element 34 having an upright post 36 and a boss 38 at the base thereof. The two E-shaped magnetic structures 12 and 14 are firmly secured to the support element 34, the lower E-shaped structure being secured directly to a vertical face on the boss 38 by means of screws 40, the upper E-shaped structure being secured to the upper end of the post 36 by means of screws 42. A non-magnetic T-shaped spacer 44 is arranged between the post and the upper E-shaped structure 12 to facilitate mounting the two E-shaped structures in a common vertical plane.

The two E-shaped structures 12 and 14 are mounted with the outer ends of their legs facing each other, the two E-shaped structures being symmetrical and symmetrically located about a rotational axis Y—Y that is perpendicular to the vibration axis X—X.

Four windings 45, 46, 47 and 48 are mounted on the four outer legs of the two E-shaped magnetic structures 12 and 14 to detect and measure changes in the reluctances of the four magnetic circuits that include the respective outer legs. Four terminals in the form of prongs 49, 50, 51 and 52 extend through and are insulated from the plug 30 to facilitate connecting the four windings 45, 46, 47 and 48 in a bridge circuit 54 as illustrated in Fig. 4. A source S applies a carrier wave voltage across one pair of diagonally opposite terminals 49 and 50 and a measuring device M detects the modulated carrier wave produced across the other pair of diagonally opposite terminals 51 and 52 when the accelerometer vibrates.

The dihedral spring structure 18 comprises a pair of identical V-shaped dihedral springs 18a and 18b. Each of the springs 18a and 18b is formed by bending a single flat leaf spring to form a right-angle resilient structure. The outer ends of one of the spring members 18b are secured by means of screws 52 to a pair of inclined faces formed on the boss 38 adjacent the upright element 36. The outer legs of the other spring member 18a are secured by means of screws 55 to inclined faces on a second support element 56 projecting inwardly from the main portion of the plug 30. The planes bisecting the dihedral springs 18a and 18b are coplanar and lie in a plane parallel to the vibration axis X—X. The apices 17a and 17b of the respective spring members 18a and 18b are collinear and lie parallel to and adjacent to the rotational axis Y—Y.

The inertia member 16 comprises two parts: a flat armature 58 and an auxiliary mass 60. The armature is composed of soft ferro-magnetic material but the inertia member is composed of non-magnetic material. The armature 58 is of diamond configuration with the corners thereof truncated, being unsymmetrical about the rotational axis Y—Y but symmetrical about its own plane of symmetry, which is perpendicular to the vibration axis X—X. The auxiliary mass 60 is in the form of a cylindrical weight having a slot 62 on one side thereof which snugly fits the ends of the armature 58 on the longer side thereof and is soldered thereto. The symmetrical corners 66,66 of the armature are secured directly to the apices 17a and 17b of the two spring elements 18a and 18b such as by being soldered thereto.

With such a symmetrical structure the center of mass of the inertia member 16 lies directly below the rotational axis Y—Y normal to the vibration axis X—X when the vibration axis X—X is horizontal. Under such circumstances the accelerometer is substantially insensitive to vibration in a vertical plane. When the vibration axis X—X is vertical the inertia member 16 is tilted slightly with respect to the horizontal. Under these circumstances the bridge circuit is slightly unbalanced while the accelerometer is at rest and the accelerometer has a small sensitivity to vibrations in a horizontal plane. This slight sensitivity in a horizontal direction, however, is detrimental, as a rule, only if small vertical vibrations are being measured in the presence of large horizontal vibrations. If it is known in advance that the accelerometer is to be used in one fixed orientation of the vibration axis X—X, the inertia member 16 may be secured to the spring structure 18 with the axis of symmetry in a plane perpendicular to the vibration axis for this particular orientation, thus rendering the accelerometer practically insensitive to vibrations in the plane of symmetry. In the present instance this is done by soldering the inertia member to the spring structure while the inertia member is tilted from the horizontal to a degree equal to the deflection caused by an acceleration of 1G. Then after the solder has cooled the inertia member, upon release, assumes the desired horizontal position.

A stop 90 in the form of a fork is mounted on the side of the upright support element 36 with the tynes 92,92 of the fork on opposite sides of the plate 58, thus limiting the amplitude of rotation of the inertia member 16 in the event that the accelerometer should be subjected to an excessive force.

With the arrangement described, the portions of the armature 58 adjacent the legs form parts of the magnetic circuits linked with the four windings 45, 46, 47 and 48. With this arrangement when the accelerometer is subjected to vibration, the vertical component of acceleration causes the inertia member 16 to rotate in an oscillatory fashion about the rotational axis Y—Y causing the reluctances of the four magnetic circuits to vary. The variations of such reluctances cause the self-inductances of the four windings 45, 46, 47 and 48 to vary in a similar manner, thus varying the degree of unbalance of the bridge circuit, thereby producing an indication of the acceleration in the measuring device M.

In practice the interior of the housing 10 is filled with oil so as to damp the oscillations of the inertia member 16. Difficulties are introduced with contraction and expansion of such damping oil as the temperature of the accelerometer rises and falls. Compensation for such variations in the volume of the damping oil is obtained with the accelerometer 10 by means of a flexible diaphragm 70 mounted in the upper mouth 24. The diaphragm 70 is firmly secured between an inner plate 72 and an outer plate 74 and the two plates 72 and 74 and the diaphragm 70 are secured in place by means of a clamping ring 76. The mouth 24 is sealed against leakage of oil by means of an O-ring 78 encircling the inner plate 72. The mouth 24 is established in the opening of a counter-bore and the inner plate 72 is provided with a circular step 77 to center the inner plate and to establish an annular space 79 of square cross-section for holding the O-ring. The diaphragm 70 and the outer plate 74 are of larger diameter than the inner plate 72 and the outer plate 74 presses the outer portions of the diaphragm against the O-ring to assure proper sealing.

The respective plates 72 and 74 are dished on their facing sides providing two cavities 82 and 84 on the inner and outer sides of the diaphragm 70 respectively. The inner plate 72 is provided with a central orifice 86 through which the expanding or contracting oil may pass and the outer plate 74 is provided with a pair of orifices 88 to permit the egress and ingress of air from the cavity 84.

The arrangement for compensating for expansion and contraction of damping oil described above is particularly advantageous because it minimizes the surging of the oil from side to side that would otherwise occur when the flexible wall 70 is distorted during transverse acceleration of the accelerometer 10.

As the temperature of the accelerometer varies, the resistances of the windings 45, 46, 47 and 48 also vary thereby causing the sensitivity of the instrument to vary the temperature. Likewise, because of the variations in resistance the phase of the signal appearing at the output of the bridge circuit relative to the signal impressed upon the input of the bridge circuit also varies with temperature. To overcome difficulties of this sort I mount compensating resistor 70 within the housing 10 immersed in the damping oil, the resistor 70 therefore always being at the same temperature as the windings. This resistor 70 is connected between the junction 72 between the two lower windings 47 and 48 and the corresponding input terminal contacts 50. The variations in resistance of the resistor 70 and those of the windings 45, 46, 47 and 48 as the temperature changes are such that the output of the bridge circuit, both in amplitude and phase remains unaffected by changes in temperature, all as more fully explained and claimed in my copending application Serial No. 233,270, filed June 23, 1951.

It is to be understood that the terms "perpendicular," "parallel," "symmetrical" and the like used in the specification and in the claims are not to be taken in their strict geometrical sense, especially since the relative orientation of some of the parts of the accelerometer vary while the accelerometer is vibrating, and also especially since deviations from exact parallelism, perpendicularity, or symmetry are permissible without departing from the main principles of my invention.

While I have described my invention in connection with but a single embodiment thereof in which the movement of the inertia member is detected by means of variations in the reluctances of magnetic circuits associated with the armature, it will be apparent that other means may be employed for measuring such rotation. Furthermore it will be understood that various changes which will now suggest themselves to those skilled in the art may be made in the material, form, and details of construction, and in the arrangement of the various parts of the accelerometer without departing from the spirit of my invention. In addition, it will be clear that though my invention has been described with particular reference to an accelerometer it is also applicable to other types of vibration and force detectors. I therefore do not wish to be limited to the specific form of my invention shown and described herein but intend to claim all forms thereof utilizing the principles of my invention.

I claim as my invention:

1. In a vibration measuring device, a base member defining a vibration axis; a dihedral spring member comprising a V-shaped element, the outer ends of the arms of said spring member being secured to said base member, the two arms thereof intersecting at an apex along a line parallel to and adjacent a rotational axis, said rotational axis being perpendicular to said vibration axis; a dynamically unbalanced inertia member including a flat inertia element secured directly to the apex of said spring member, said inertia member oscillating about said rotational axis when said base is vibrated along said vibration axis; and means for detecting angular movement of said inertia member about said pivot axis.

2. In a vibration measuring device a base member defining a vibration axis; a dihedral spring member comprising a V-shaped element, the outer ends of the arms of said spring member being secured to said base member, the two arms thereof intersecting at an apex along a line parallel to and adjacent a rotational axis, said rotational axis being perpendicular to said vibration axis; a symmetrical dynamically unbalanced inertia member including a flat inertia element secured directly to the apex of said spring member and an auxiliary mass member secured to one end of said bar-shaped member, the axis of symmetry of said inertia member extending through said rotational axis in a direction perpendicular to said vibration axis, said inertia member, mass member and said bar-shaped member together oscillating about said pivot axis when said base is vibrated along said vibration axis; and means for detecting angular movement of said inertia member about said pivot axis.

3. In a vibration measuring device, a base member defining a vibration axis; a magnetic circuit including a magnetic structure mounted on said base member; a V-shaped dihedral spring structure having its outer ends secured to said base member, the plane bisecting said dihedral spring structure being coplanar and lying parallel to said vibration axis, said spring structure determining a rotational axis adjacent said apex, said rotational axis being perpendicular to said vibration axis; a flat armature member composed of soft ferromagnetic material secured directly tr the apex of said spring structure, a portion of said armature member forming part of said magnetic circuit; an auxiliary mass member secured to one end of said armature, said mass member and said bar-shaped member together forming a dynamically unbalanced interia member that oscillates about said rotational axis when said base is vibrated along said vibration axis whereby the reluctance of said magnetic circuit varies; and means including a coil linking said magnetic circuits responsive to changes in said reluctance.

4. In a vibration measuring device, a base member defining a vibration axis; a magnetic circuit including a magnetic structure mounted on said base member; a V-shaped dihedral spring structure having its outer ends secured to said base member, the plane bisecting said dihedral spring structure being parallel to said vibration axis, said spring structure determining a rotational axis adjacent said apex, said rotational axis being perpendicular to said vibration axis; a flat armature member composed of soft ferromagnetic material secured directly to the apex of said spring structure, a portion of said armature member forming part of said magnetic circuit; an auxiliary mass member secured to one end of said armature, the mass of said mass member being symmetrically located about the plane of said bar-shaped member, said mass member and said bar-shaped member together forming a dynamically unbalanced inertia member that oscillates about a rotational axis when said base is vibrated along said vibration axis whereby the reluctance of said magnetic circuit varies; and means including a coil linking said magnetic circuits responsive to changes in said reluctance.

5. In a vibration measuring device, a base member defining a vibration axis; a pair of E-shaped magnetic structures mounted on said base member with their legs facing each other, said E-shaped members lying in a common plane, said legs being symmetrically located with respect to a rotational axis transverse to said plane; four magnetic circuits comprising respectively the four outer legs of said two E-shaped members; a pair of dihedral spring members each comprising a V-shaped element, the outer ends of said spring members being secured to said base member, the planes bisecting said dihedral spring members being coplanar and lying parallel to said vibration axis, and the apices of said spring members being parallel to said rotational axis; a flat armature member composed of soft ferromagnetic material secured directly to the apices of said spring members; an auxiliary mass member secured to one end of said armature, said mass member and said bar-shaped member together forming a dynamically unbalanced inertia member that oscillates about said rotational axis when said base is vibrated along said vibration axis whereby the reluctances of said magnetic circuits are varied; and means including four coils linking the respective magnetic circuits for detecting changes in the relative magnitudes of said reluctances.

6. In a vibration sensitive device in which movement of an inertia member mounted in a housing is damped by liquid contained in said housing, the improvement which comprises a flexible member forming a portion of the wall of said housing and an apertured internal wall member separating said flexible member from the space in which said inertia member is mounted.

7. In a vibration sensitive device in which movement of an inertia member mounted in a housing is damped by liquid contained in said housing, the improvement which comprises a flexible member forming a portion of the wall of said housing and an internal wall member separating the space adjacent said flexible member from the space in which said inertia member is mounted, said internal wall member having an aperture therein of small cross-section.

8. In a measuring device, a base member; a dihedral spring member comprising a V-shaped element, the outer ends of the arms of said spring member being secured to said base member, the two arms thereof intersecting at an apex along a line parallel to and adjacent a rotational axis; an inertia member secured directly to the apex of said spring member, said inertia member being adapted to oscillate about said rotational axis; and means for detecting angular movement of said inertia member about said pivot axis.

9. In a vibration measuring device, a base member; a pair of E-shaped magnetic structures mounted on said base member with their legs facing each other, said E-shaped members lying in a common plane, said legs being symmetrically located with respect to a rotational axis transverse to said plane; four magnetic circuits comprising respectively the four outer legs of said two E-shaped members; a pair of dihedral spring members each comprising a V-shaped element, the outer ends of said spring members being secured to said base member, the planes bisecting said dihedral spring members being coplanar, and the apices of said spring members being parallel to said rotational axis; a flat armature member composed of soft ferromagnetic material secured directly to the apices of said spring members, said armature member being adapted to oscillate about said rotational axis whereby the reluctances of said magnetic circuits are varied; and means including four coils linking the respective magnetic circuits for detecting changes in the relative magnitudes of said reluctances.

THOMAS H. WIANCKO.

No references cited.